(12) United States Patent
Anheyer

(10) Patent No.: US 7,905,113 B2
(45) Date of Patent: *Mar. 15, 2011

(54) COOLING TUBE MECHANISM FOR AN I. S. MACHINE

(75) Inventor: Wolfgang Anheyer, Neuss (DE)

(73) Assignee: Emhart Glass S.A., Cham (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/639,620

(22) Filed: Dec. 15, 2006

(65) Prior Publication Data

US 2008/0145467 A1    Jun. 19, 2008

(51) Int. Cl.
*C03B 9/40* (2006.01)
*C03B 9/36* (2006.01)

(52) U.S. Cl. ........... 65/301; 65/300; 65/261; 65/81; 65/82; 65/160; 65/161; 65/29.15

(58) Field of Classification Search ............ 65/81, 261, 65/227, 243, 300, 160, 161, 301, 29.15
See application file for complete search history.

(56) References Cited

U.S. PATENT DOCUMENTS

| 2,640,298 | A | * | 6/1953 | Winder ............... 65/300 |
| 6,401,491 | B1 | | 6/2002 | Wacke |
| 6,635,216 | B2 | * | 10/2003 | Dundas et al. ......... 264/525 |
| 6,705,121 | B2 | * | 3/2004 | Mungovan et al. ......... 65/261 |
| 6,807,827 | B2 | * | 10/2004 | Anheyer et al. ......... 65/161 |
| 6,807,829 | B2 | * | 10/2004 | Fenton et al. ......... 65/261 |
| 6,857,291 | B2 | * | 2/2005 | Diehm et al. ......... 65/29.15 |
| 2003/0101751 | A1 | * | 6/2003 | Fenton et al. ......... 65/158 |
| 2003/0101754 | A1 | | 6/2003 | Hyre et al. |
| 2003/0101764 | A1 | | 6/2003 | Hyre et al. |

FOREIGN PATENT DOCUMENTS

GB    2297548 A    8/1996

* cited by examiner

*Primary Examiner* — Jason L. Lazorcik
(74) *Attorney, Agent, or Firm* — Reinhart Boerner Van Deuren S.C.

(57) ABSTRACT

An I.S. machine has a blow station where a parison is blown into a bottle. The parison is blown with a blow head at the "on" position on the blow mold and following the blowing of the parison, the blow head is lifted away from the blow mold. The spacing between the blow head and the mold is defined by a Pressure Profile which is responsive to the sensed pressure within the mold.

6 Claims, 9 Drawing Sheets

COOLING TUBE MECHANISM FOR AN I. S. MACHINE

This invention relates to an I.S. Machine and more particularly to a mechanism which has displaceable cooling tubes for cooling the interior of a bottle after it has been formed in a blow mold of the machine.

BACKGROUND OF THE INVENTION

Glass bottles are manufactured in an I.S. Machine in a two-step process. A "parison" is first formed in a blank station and the parison is then delivered to a blow station where the parison, located within a blow mold, is blown into a bottle. The blown bottle can be displaced to a dead plate and, when cooled, pushed onto a conveyor for removal from the machine. Heat can be removed from a formed bottle by chilling the outer surface or by flowing air through a blow tube into the bottle interior.

U.S. Pat. No. 6,776,010, discloses a blow station of an I.S. Machine which utilizes a blow tube which is oscillated during the time when a bottle is in the blow mold and U.S. Pat. No. 6,766,665, discloses post blow station structure which utilizes an oscillating tube to continue the flow of cooling air into the bottle following the removal of the bottle from the blow station.

OBJECT OF THE INVENTION

It is an object of the present invention to provide an improved cooling tube mechanism for introducing cooling air into bottles formed in an I.S. Machine Other objects and advantages of the present invention will become apparent from the following portion of this specification and from the accompanying drawings which illustrate, in accordance with the patent statutes, a presently preferred embodiment incorporating the principles of the invention.

DESCRIPTION OF THE PREFERRED EMBODIMENT

Figure 1:
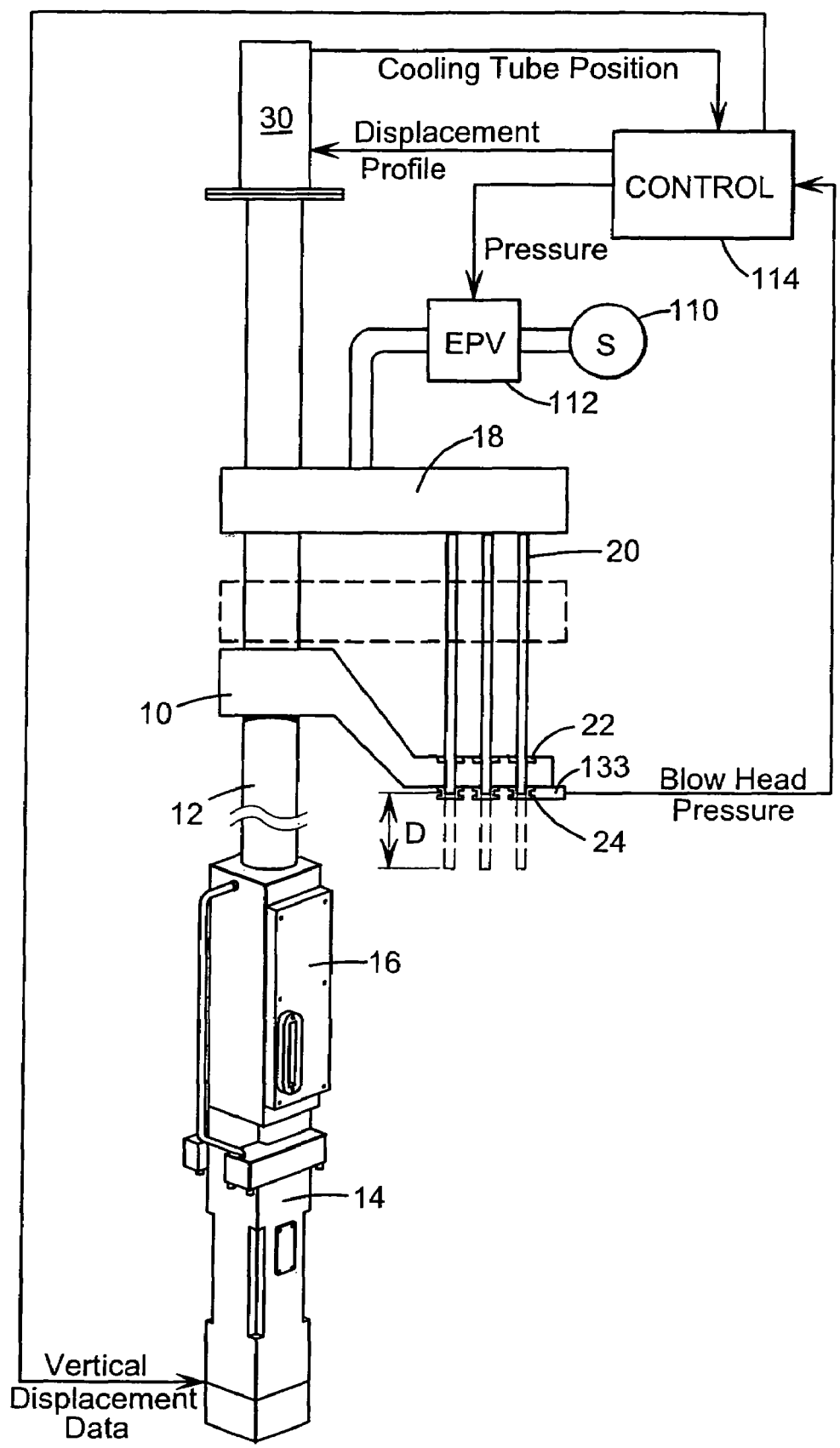
FIG. 1 is a schematic showing of a blow head mechanism for an I.S. Machine made in accordance with the teachings of the present invention.

FIG. 1 illustrates a blow head mechanism for an I.S. Machine which includes a guide arm 10 which is mounted on a vertical post 12. The post 12 is coupled to an electronic (servo) motor 14 which causes the guide arm to move between up and down locations. A conventional scroll cam assembly 16, causes the guide arm to pivot between retracted and advanced positions. The up/retracted position is the "off" position and the advanced/down position is the "on" position. The blow head mechanism also includes a cooling tube arm assembly 18 which supports a number of cooling tubes 20 which correspond in number to the number of bottles being formed in the blow station. The cooling tube arm assembly is shown at its first position where the cooling tubes extend downwardly into vertical openings in the guide arm. Suitable guides 22 are located at the top of these openings in the guide arm. Blow heads 24 are secured to the guide arm at the bottom of these openings. The cooling tube arm assembly is mounted on the post 12 and will move with the guide arm between on and off positions. At the first position, a parison could be blown into a bottle within a blow mold. The cooling tube guide assembly is also displaceable between the illustrated first position, where the bottom of the cooling tubes are located for blowing a parison into a bottle and a second position, shown in dotted lines, where the cooling tubes have been lowered a selected distance D, which corresponds to the insertion of the cooling tube to a position proximate the bottom of the blow bottle.

Figure 2:
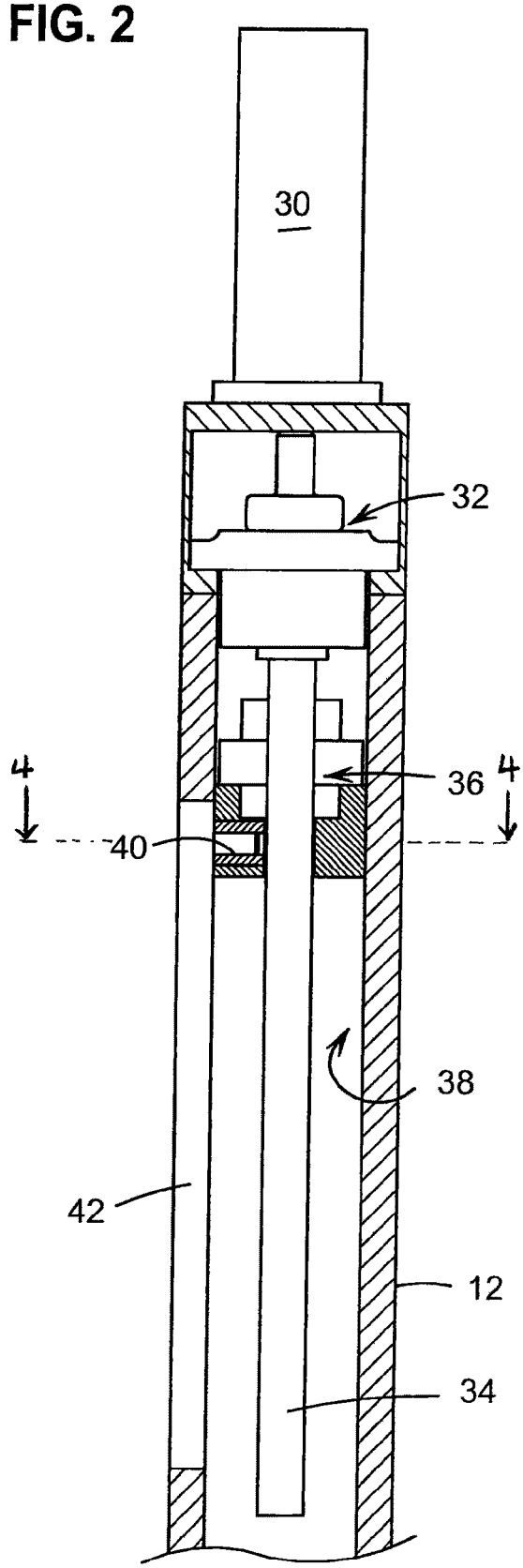
FIG. 2 is an elevational cross sectional view of the top portion of the blow head column illustrated in FIG. 1.
Figure 3:
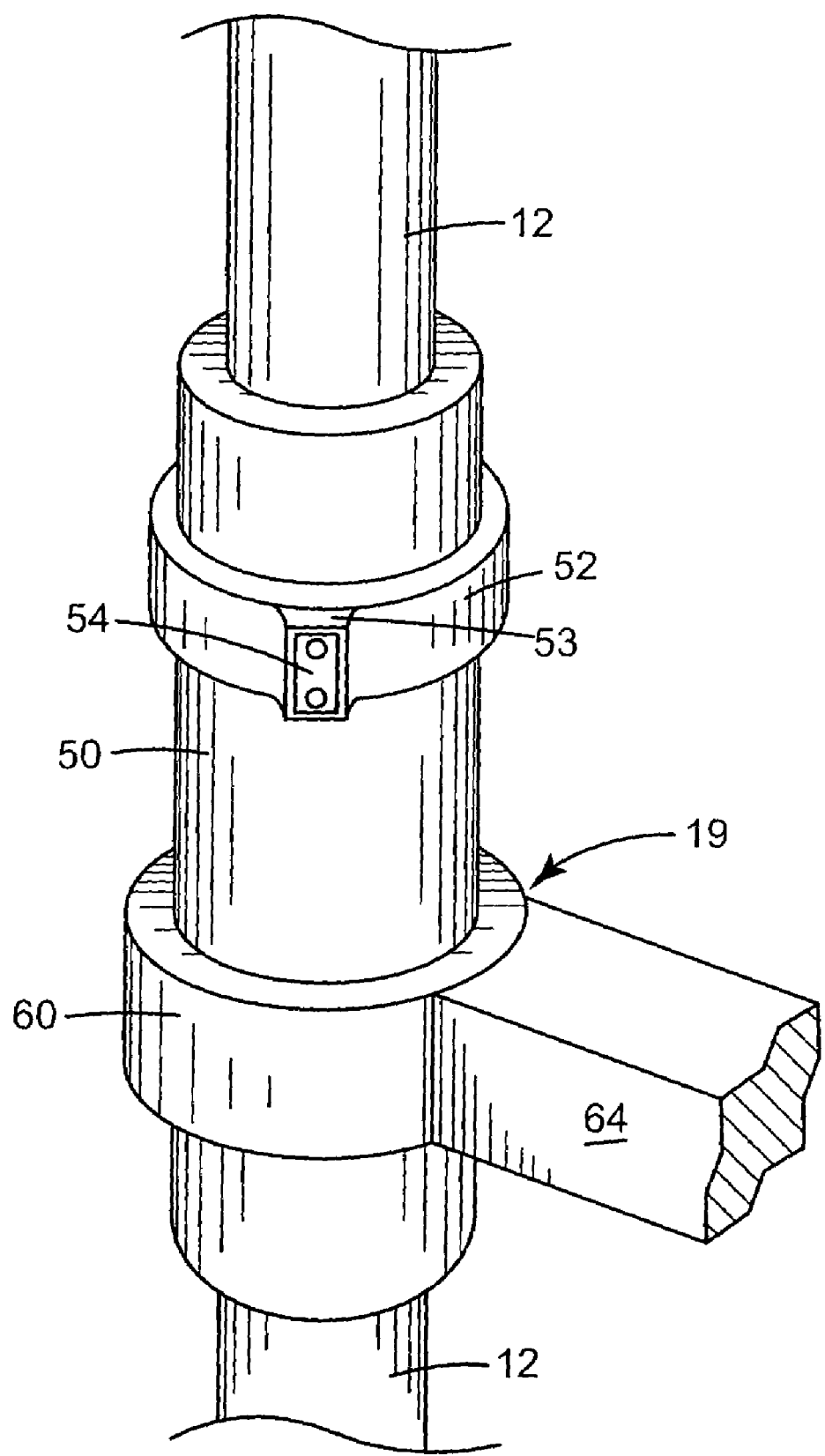
FIG. 3 is a perspective view of a slidable support for the cooling tube assembly.
Figure 4:
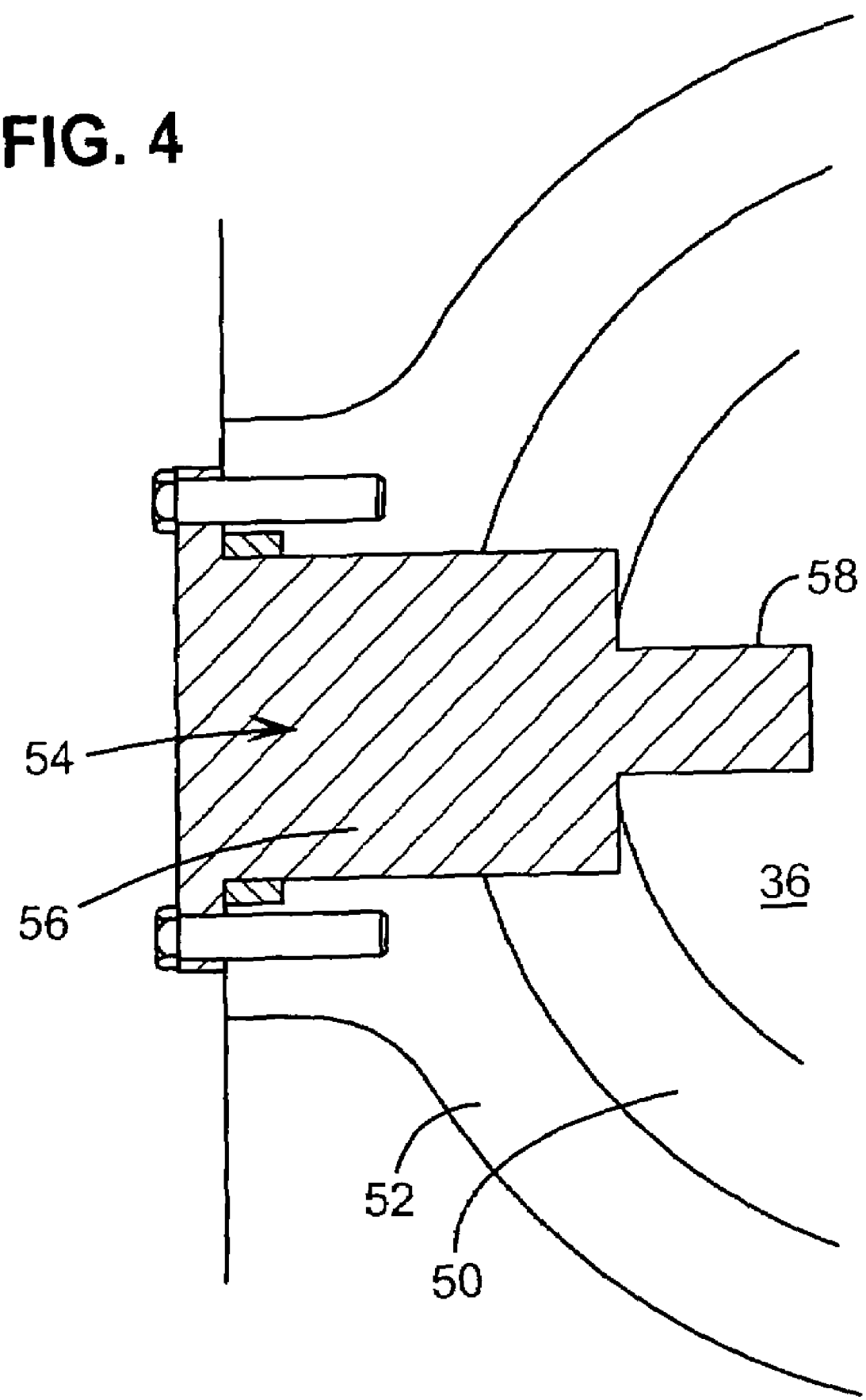
FIG. 4 is a portion of a horizontal cross sectional view of the column taken at 4-4 of FIG. 2.

The drive assembly for the cooling tube arm assembly is shown in FIG. 2 and includes a servo motor 30 connected via a coupling 32 to a lead screw 34. The lead screw is operatively associated with a nut 36 which can be driven along the inner bore 38 defined in the upper portion of the post 12. The nut has a pin receiving hole 40 and the post has an elongated vertical slot 42. Vertically displaceable along the outer surface of the post is a slide housing 50 (FIG. 3). Proximate the top of the slide housing is a collar 52 having a boss 53 which supports a key 54 (see also FIG. 4) having a first key portion 56 for fitting the slot 42 of the post and a second pin portion 58 for fitting the pin receiving hole 40 in the nut 36. The slide housing will accordingly be vertically displaced with the nut.

Figure 5:
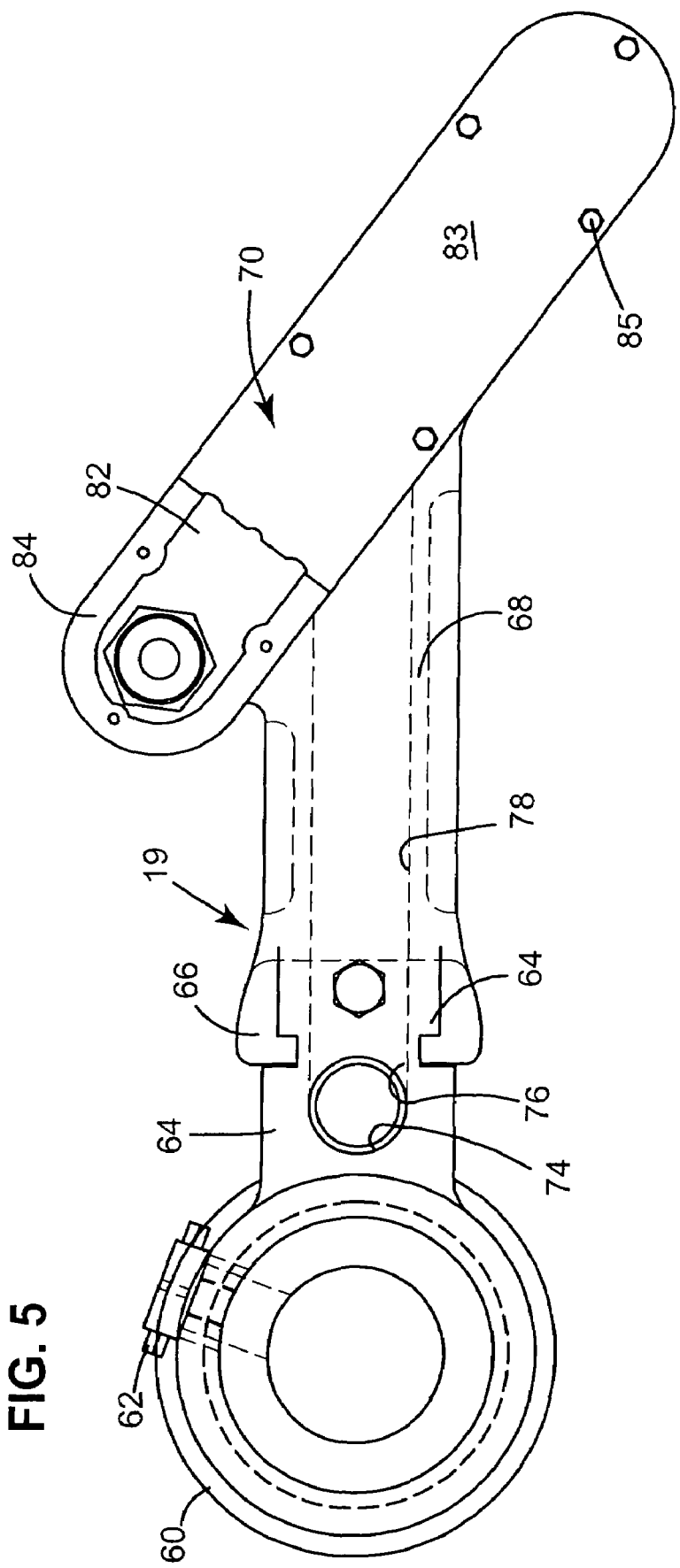
FIG. 5 is a top view of the cooling tube assembly.
Figure 6:
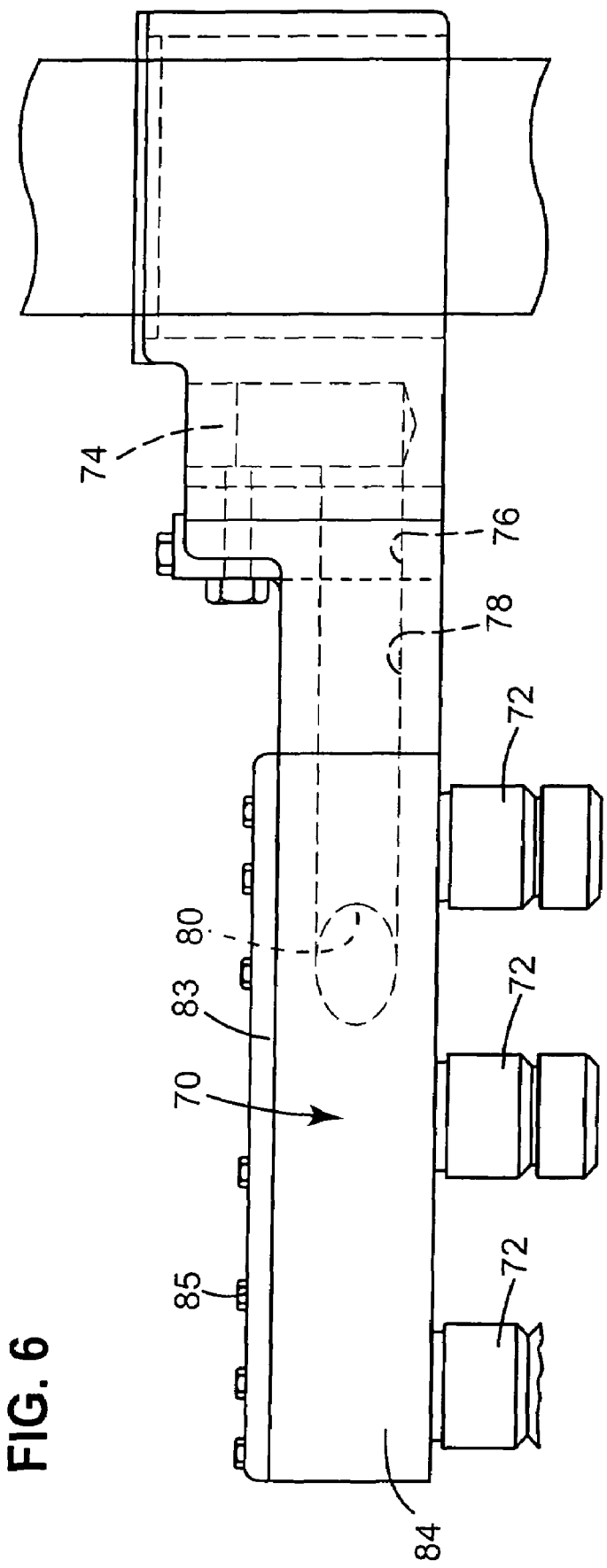
FIG. 6 is an elevational view of the cooling tube assembly.

Releasably secured to the slide housing is the cooling tube arm 18. The cooling tube arm has a cylindrical mounting sleeve portion 60 (FIG. 5) which is slidingly received by the slide housing and which can be secured to the slide housing at any vertical location below the collar 52 and at any angular position with a mounting screw 62. The mounting sleeve portion 60 has a keyed portion 64 which receives a corresponding portion 66 at the end of the arm portion 68 of the cooling tube arm. The cooling tube arm supports an elongated plenum or fluid chamber 70. Compressed air or other cooling fluid is supplied, via an inlet 74 (FIG. 6) on the mounting sleeve portion 60, to a mounting sleeve portion bore 76. This bore communicates with a bore 78 in the arm portion 68 which communicates via opening 80 with the interior 82 of the plenum chamber. Access to the plenum chamber is provided by a top 83 secured by suitable screws 85.

Figure 7:
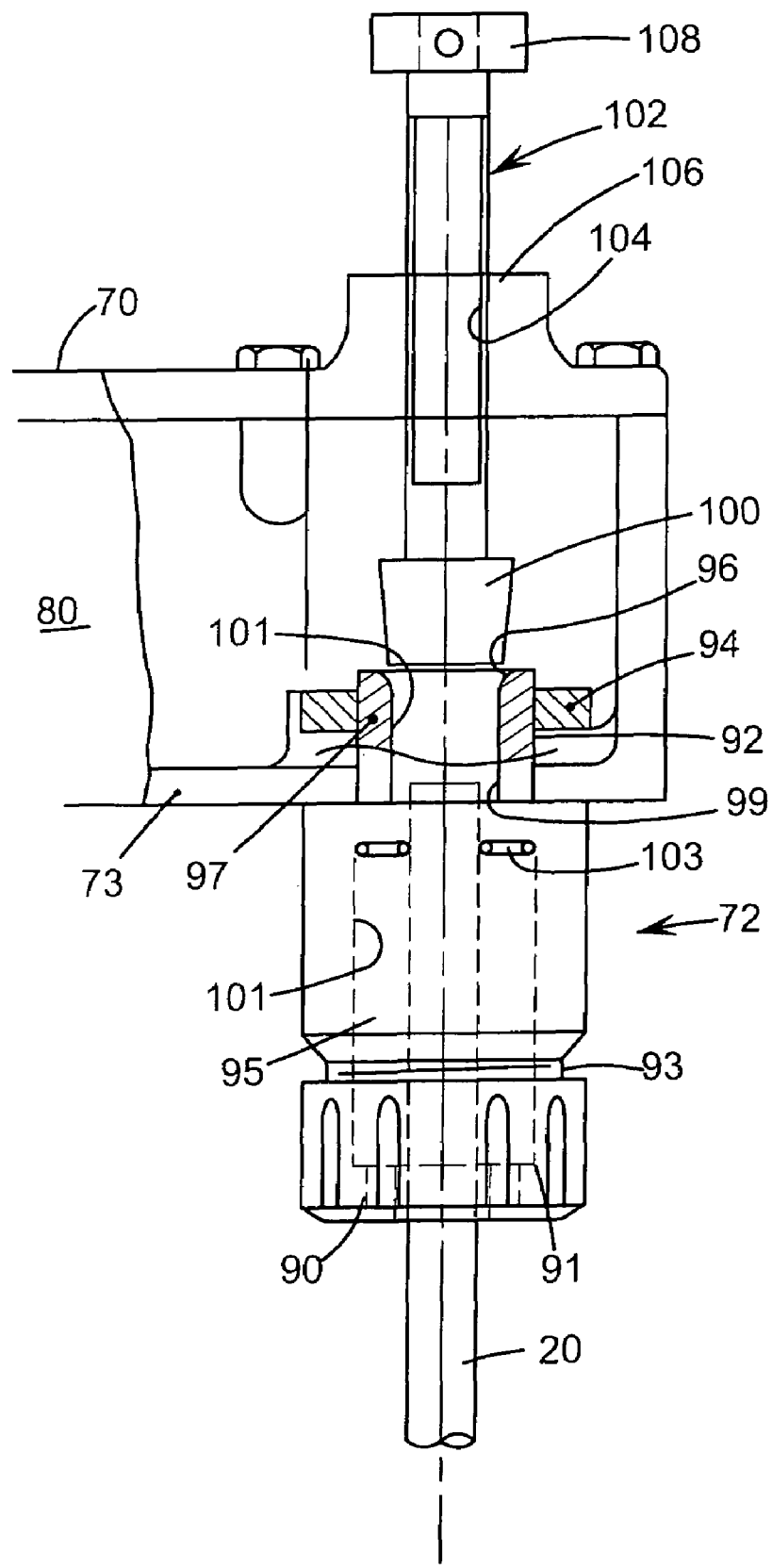
FIG. 7 is cross sectional view of a cooling the head and associated flow control.
Figure 8:
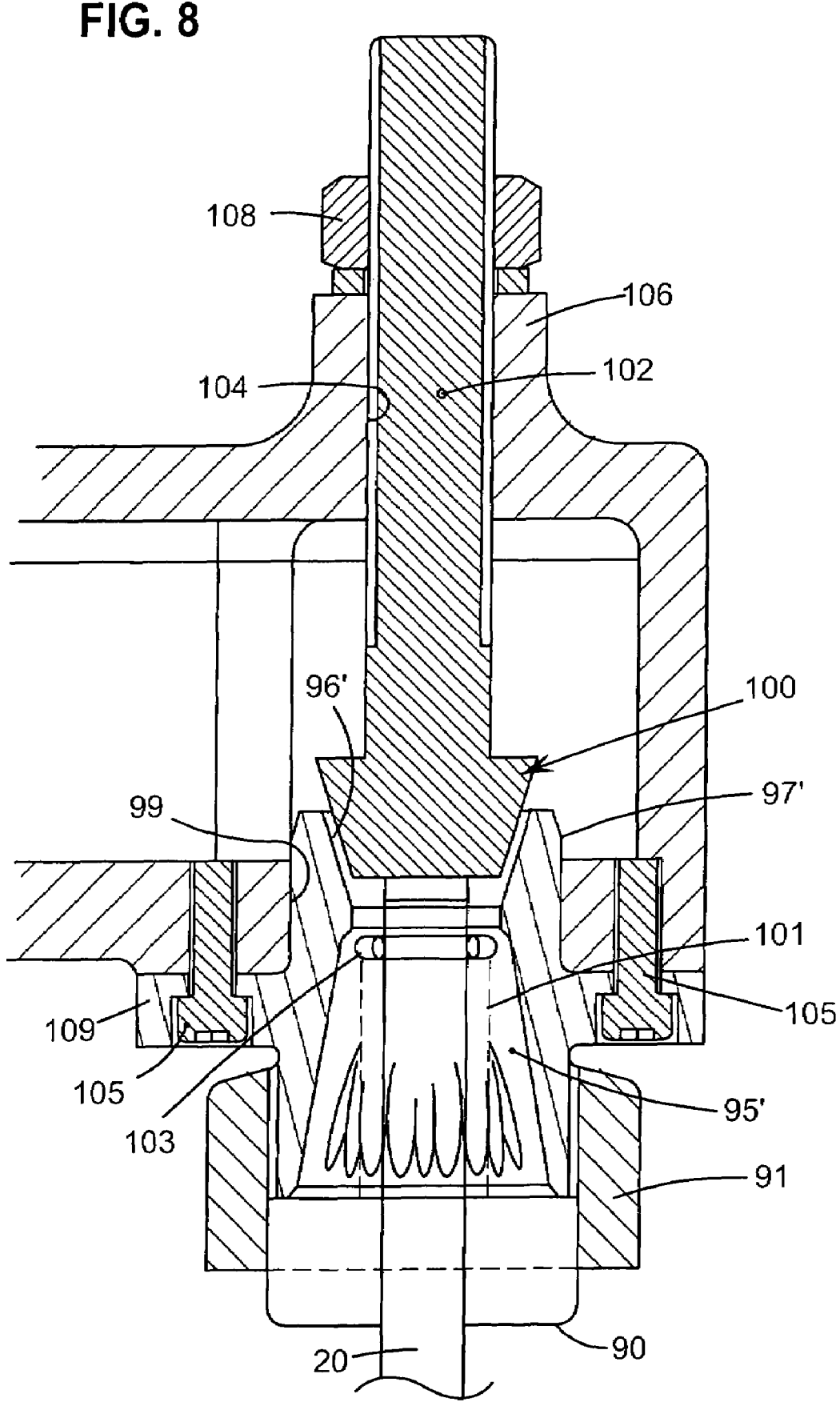
FIG. 8 is an oblique view showing an alternate coupling device for the cooling tube chuck shown in FIG. 7.

A cooling tube chuck 72, for each cooling tube, is attached to the bottom wall 73 of the plenum chamber. The cooling tube chuck, shown in FIG. 7, is defined by a conventional collet 90, a conventional collet nut 91, and a conventional collet holder 95, which has a first threaded end 93 for receiving the collet nut. The conventionally tapered end of the collet holder has been modified to include a second externally threaded 92, reduced diameter post portion 97 sized to pass through a hole 99 in the bottom wall 73 of the plenum chamber. The post portion receives a clamp nut 94 for sealingly mounting the collet holder on the bottom wall of the plenum chamber. A stepped axial hole 101 extends through the collet holder. Alternately, the collet holder 95' may be designed to have an enlarged clamp plate 109 (FIG. 8) which can be releasably secured to the bottom wall of the plenum chamber from the outside of the plenum chamber via suitable screws 105 (the post 97' need not be externally threaded with this attachment). The cooling tube chuck releaseably holds a collet 90 suitable for holding a particular cooling tube 20. The collet holder 95, 95 is effectively sealed via an inside/outside sealing ring 103 (an available collet accessory). The outer diameter of the cooling tube is selected to correspond with the inner seal dimension. Cooling tubes can accordingly be quickly attached to or removed from the plenum chamber.

The inner annular surface of the reduced diameter post 97, 97' opening is radiused/bevelled 96, 96' and located axially above the post is a needle valve 100, which is at the end of a threaded shaft 102. The threaded shaft is received by a threaded hole 104 in a boss 106 and has a turn knob 108 at the top. Flow into each cooling tube can accordingly be varied to achieve the desired flow through each cooling tube.

In operation, a parison, located in a blow mold, can be blown into a bottle when the guide arm and the cooling tube arm are at the advanced/down position and the cooling tube arm is at the first, blow parison, up position. The cooling tube functions as the blow tube of the blow head. Once the parison has been blown into a bottle the blow tube arm can be displaced vertically from the first position to the second, bottom or down, position to deliver cooling air, as desired, at a location proximate the bottom of the bottle. While the invention has been disclosed as a blow head mechanism, the structure, minus the blowheads could be a mechanism used to cool bottles at a dead plate location or at any subsequent location in the glass process.

Figure 9:
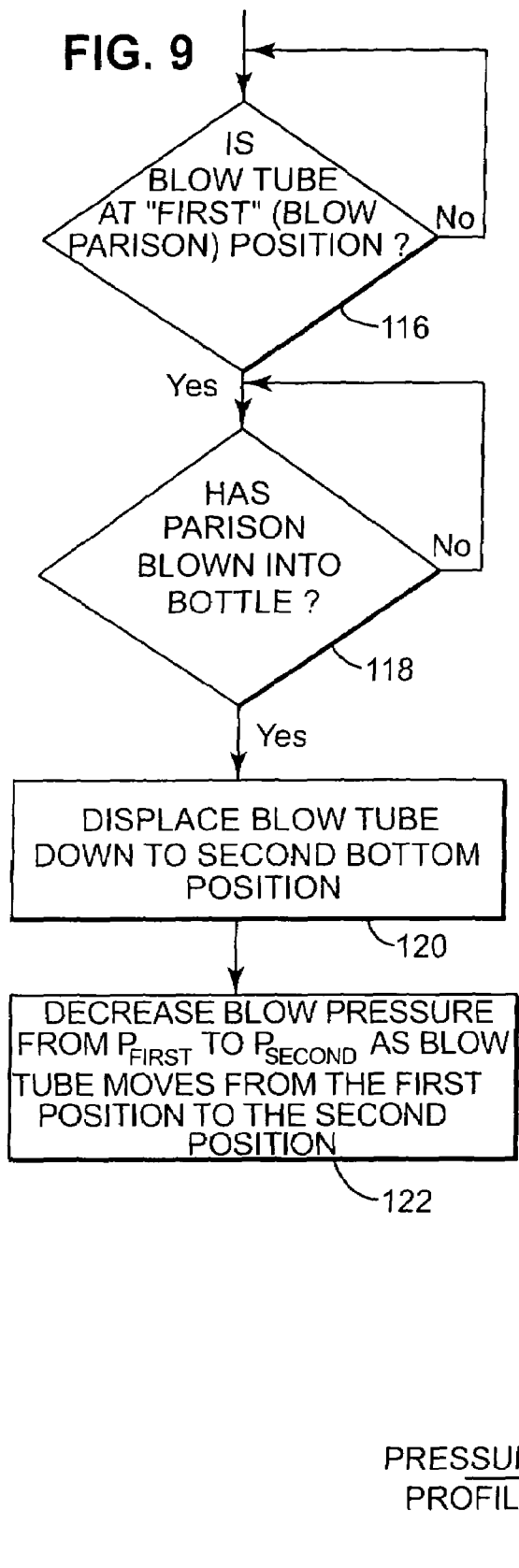
FIG. 9 is a logic diagram illustrating the control of air pressure to the cooling tubes as a function of position as they are displaced from the up position to the down position following the blowing of a parison into a bottle.

As shown in FIG. 1, air under pressure can be supplied to the cooling tube arm from a suitable source S/110 of high pressure air. The supplied air passes through an electronically controlled proportional valve (EPV/112) at a Pressure selected by a suitable Control 114. As shown in FIG. 1, the Control supplies a Displacement Profile to the Motor 30 and receives Cooling Tube Position data from the motor 30. When the Control, as shown in FIG. 9, answers the query "Is Blow Tube At "First" (Blow Parison) Position"/116 in the affirmative and determines that the parison has been blown into a bottle (answers the query "Has Parison Blown Into A Bottle"/118 in the affirmative), it will issue a signal, "Displace Blow Tube Down To Second Bottom Position"/120 and will conjointly "Decrease Blow Pressure From $P_{first}$ to $P_{second}$ As Blow Tube Moves From The First Position To The Second Position"/122. The system may either automatically determine that the parison has been blown or the time of this event may be set by the operator based on his experience. Such decrease in pressure may be linear.

Figure 10:
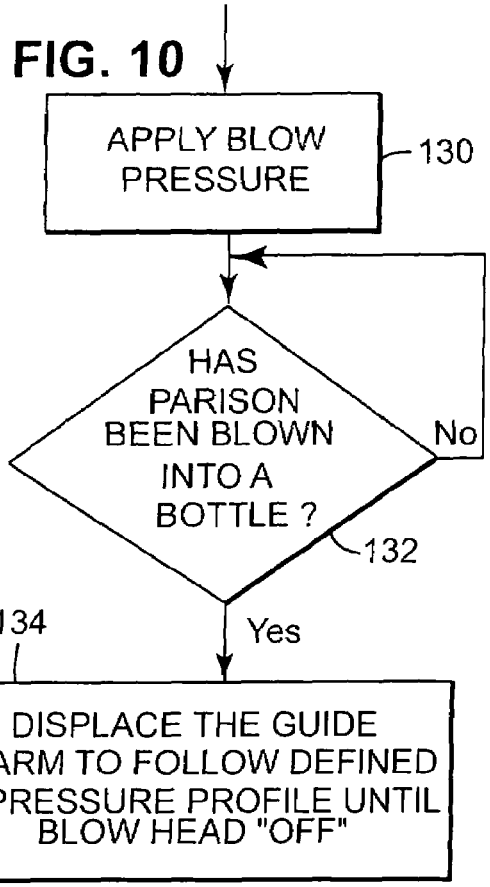
FIG. 10 is a logic diagram illustrating the control of the vertical displacement of the control arm as a function of blow head pressure.

FIG. 10 illustrates a control algorithm for the guide arm. When the blow heads are at the "on" position, the Control 114 will issue an instruction to Apply Blow Pressure 130. When the control answers the inquiry "Has Parison Been Blown Into A Bottle" 132 in the affirmative, which can be based on detecting a drop in pressure at the blow head pressure sensor 133 or by the operator setting an event angle in the timing control for the time when he believes formation occurs, the Control 114 will "Displace The Guide Arm To Follow Defined Pressure Profile Until Blow Head "Off" 134. The operator can input the desired Pressure Profile. For example, the Pressure Profile may be a constant pressure profile set at a level that will maintain the blown parison against the inner surface of the mold. The guide arm 10 would accordingly be displaced to a location where the heads were spaced from the top of the blow molds and would thereafter be displaced vertically up or down in response to an increase or decrease in the pressure of Source air delivered to the cooling tube. In the above situation where the source pressure is reduced, following blowing the parison into a bottle, as the cooling tube is lowered and the pressure reduced, this algorithm would result in the blow head, being displaced toward the top of the blow mold to maintain the desired constant internal pressure. The Pressure Profile could also provide for an increase in internal pressure as a function of time following the blowing of the parison. This could be the case, for example, in the event that the source pressure was substantially increased following the blowing of the parison and the partial cooling of the bottle. The arm could follow a pressure profile where the pressure increases over time (the arm would be progressively lowered) as the bottle progressively cools and strengthens.

The invention claimed is:

1. An I.S. machine having a blow station at which a parison is blown into a bottle in a blow mold comprising:
    a guide arm including a plurality of blow heads;
    a cooling tube arm assembly;
    a corresponding number of vertical cooling tubes operatively associated with said blow heads, said corresponding number of vertical cooling tubes being coupled to said cooling tube arm assembly;
    a first motor for displacing said cooling tube arm assembly independently of said guide arm between a first up position and a second down position;
    a second motor configured to displace said guide arm;
    a vertical post having a vertical slot and a lead screw within the post, the lead screw coupled to the motor and including a nut coupled to the guide arm;
    a source of pressurized air;
    a conduit coupled to the source of pressurized air and to said vertical cooling tubes;
    a pressure regulator coupled to the conduit for defining the pressure of the air delivered to said cooling tubes;
    a sensor coupled to the blow head and configured to obtain the pressure of the supplied air in the blow head; and
    a control
        for operating said second motor to displace said guide arm pursuant to a selected pressure profile as a function of the air pressure sensed in the blow head, wherein the guide arm is displaced to a location where the blow head is spaced from the blow mold in response to the air pressure defined by the pressure profile to maintain an internal bottle pressure at the specified pressure profile over time.

2. An I.S. machine having a blow station at which a parison is blown into a bottle in a blow mold of claim 1, including a slide housing for sliding vertically on the vertical post above the guide arm and including a key for extending through the vertical slot for interconnecting the slide housing and the nut.

3. An I.S. machine having a blow station at which a parison is blown into a bottle in a blow mold of claim 2, including said cooling tube arm assembly coupled to the slide housing, wherein the cooling tube arm assembly is configured to move vertically as the nut moves on the lead screw.

4. An I.S. machine having a blow station at which a parison is blown into a bottle in a blow mold of claim 1, wherein the pressure regulator includes an electronically controlled proportional valve coupled to the source of pressurized air and the control.

5. An I.S. machine having a blow station at which a parison is blown into a bottle in a blow mold, comprising:
    a vertical post;
    a blow head mechanism including a guide arm and a cooling tube arm assembly;
        said guide arm including a plurality of blow heads;

said guide arm locatable at an "on" blow mold position;
said guide arm being operably coupled to said vertical post;
a plurality of cooling tubes coupled to said cooling tube arm assembly;
said cooling tube arm assembly being operably coupled to said vertical post;
said cooling tube arm assembly displaceable independently of said guide arm;
a head pressure sensor configured to sense the pressure within the blow head;
a first motor configured to displace said guide arm between an "off" blow mold position and an "on" blow mold position;
a second motor configured to displace said cooling tube arm assembly independently of said guide arm;
a control mechanism in communication with said head pressure sensor and said motors;
said control mechanism configured to control said first motor to adjust the location of said blow head mechanism pursuant to a selected pressure profile as a function of pressure within the blowhead sensed by said head pressure sensor.

6. An I.S. machine having a blow station at which a parison is blown into a bottle in a blow mold of claim 5, further comprising:
a slide housing for sliding vertically on said vertical post above said guide arm;
a nut; and
a key for extending through a vertical slot for operably coupling said slide housing and said nut.

* * * * *